US009972355B2

(12) United States Patent
Endo

(10) Patent No.: US 9,972,355 B2
(45) Date of Patent: May 15, 2018

(54) IMAGE PROCESSING APPARATUS, METHOD FOR CONTROLLING IMAGE PROCESSING APPARATUS, AND NON-TRANSITORY COMPUTER READABLE STORAGE MEDIUM

(71) Applicant: CANON KABUSHIKI KAISHA, Tokyo (JP)

(72) Inventor: Hiroaki Endo, Hachioji (JP)

(73) Assignee: Canon Kabushiki Kaisha, Tokyo (JP)

(*) Notice: Subject to any disclaimer, the term of this patent is extended or adjusted under 35 U.S.C. 154(b) by 2 days.

(21) Appl. No.: 14/878,572

(22) Filed: Oct. 8, 2015

(65) Prior Publication Data

US 2016/0105632 A1 Apr. 14, 2016

(30) Foreign Application Priority Data

Oct. 10, 2014 (JP) ................. 2014-209395

(51) Int. Cl.
| | |
|---|---|
| *H04N 5/77* | (2006.01) |
| *G11B 27/00* | (2006.01) |
| *H04N 5/783* | (2006.01) |
| *H04N 9/804* | (2006.01) |
| *H04N 9/82* | (2006.01) |

(52) U.S. Cl.
CPC .......... *G11B 27/005* (2013.01); *H04N 5/772* (2013.01); *H04N 5/783* (2013.01); *H04N 9/8047* (2013.01); *H04N 9/8205* (2013.01)

(58) Field of Classification Search
CPC ...... H04N 5/772; H04N 1/2112; H04N 5/907; H04N 2101/00; H04N 5/77
USPC ........................................ 386/224
See application file for complete search history.

(56) References Cited

U.S. PATENT DOCUMENTS

| | | | | |
|---|---|---|---|---|
| 2009/0129746 A1* | 5/2009 | Isnardi | .................... | H04N 5/913 386/252 |
| 2010/0061707 A1* | 3/2010 | Kosakai | ................. | H04N 5/232 386/241 |
| 2014/0186006 A1* | 7/2014 | Jin | ......................... | H04N 5/783 386/230 |

FOREIGN PATENT DOCUMENTS

| | | |
|---|---|---|
| JP | 2011-244423 A | 12/2011 |
| JP | 2014-179851 A | 9/2014 |
| JP | 2014-179852 A | 9/2014 |
| JP | 2014-179853 A | 9/2014 |
| JP | 2014-179854 A | 9/2014 |

(Continued)

*Primary Examiner* — William C Vaughn, Jr.
*Assistant Examiner* — Daniel Tekle
(74) *Attorney, Agent, or Firm* — Cowan, Liebowitz & Latman, P.C.

(57) ABSTRACT

An image processing apparatus comprising a reading unit reading out a movie file including RAW image data from a recording medium, an image development unit developing the RAW image data, a display control unit controlling a display unit to display the RAW image data that were developed, and an operation unit instructing a display rate of an image displayable by the display unit, wherein the image development unit executes image development by switching between first image development processing and second image development processing, the image development unit switches image development processing of the RAW image data from the first image development processing to the second image development processing in response to an instruction to lower the display rate while the RAW image data developed by the first image development processing is being displayed.

9 Claims, 11 Drawing Sheets

(56) References Cited

FOREIGN PATENT DOCUMENTS

WO        2014/141637 A1    9/2014
WO        2014/141638 A1    9/2014

\* cited by examiner

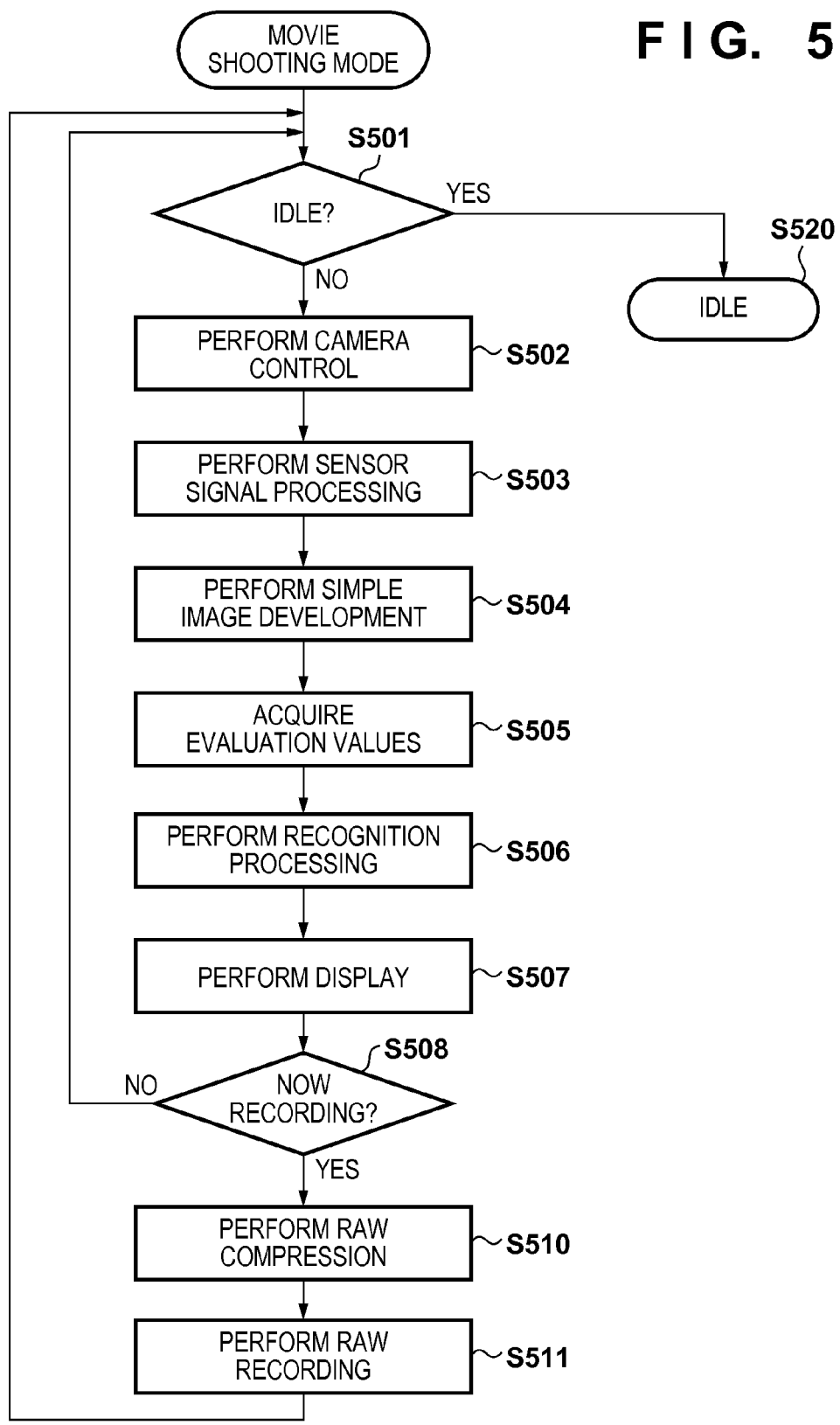

IMAGE PROCESSING APPARATUS, METHOD FOR CONTROLLING IMAGE PROCESSING APPARATUS, AND NON-TRANSITORY COMPUTER READABLE STORAGE MEDIUM

BACKGROUND OF THE INVENTION

Field of the Invention

The present invention relates to an image processing apparatus, a method for controlling the image processing apparatus, and a non-transitory computer readable storage medium.

Description of the Related Art

An image capturing apparatus converts undeveloped image information (a RAW image) captured by an image sensor into signals including luminance and color differences. So-called image development processing, for example, such as noise reduction, optical distortion correction, or image optimization, is performed on each of the obtained signals. After the image development processing has been performed on these luminance and color difference signals, the signals undergo compression encoding, and then the compressed signals are recorded to a recording medium.

On the other hand, an image capturing apparatus that can record a RAW image itself also exists. Although a large amount of data is needed for recording a RAW image, a RAW image has the advantages that correction or degradation of an original image is suppressed, and the RAW image can be edited after image shooting occurred. Japanese Patent Laid-Open No. 2011-244423 discloses a configuration of an apparatus that records a RAW image. In the configuration described in Japanese Patent Laid-Open No. 2011-244423, image development parameters are recorded together with the RAW image, and when performing image playback, development and playback of the RAW image is performed using those image development parameters.

In recent years, with advancements in image sensors, the number of pixels in a single image has been increasing. There has also been a tendency for the number of images that can be continuously captured per second to increase. Therefore, the amount of processing in image development processing that is performed on RAW images, such as debayer processing, noise removal, and optical distortion correction, for example, has greatly multiplied. As a result, large circuitry and much power consumption may be required when performing image development processing concurrently with image shooting. In some cases, it may not be possible to realize high image shooting performance because of limitations on the space occupied by circuits or the power consumption needed for image development processing, for example.

On the other hand, if a configuration is adopted in which RAW images are recorded without being developed, as described in above Japanese Patent Laid-Open No. 2011-244423, the amount of processing for image development when shooting images can be reduced, but large circuitry is necessary to perform image development processing in real time when performing image playback. Thus, in order to realize high performance in an image capturing apparatus with this configuration, it is necessary to incorporate high-cost circuitry and enable this circuitry to be driven with high output.

SUMMARY OF THE INVENTION

The present invention enables real time image development processing that accompanies movie playback to be performed with a small circuit scale and low power consumption using simple image development with a small amount of processing, and also enables high quality images to be provided under predetermined conditions.

One aspect of embodiments of the present invention relates to an image processing apparatus, comprising, a reading unit configured to read out a movie file that includes a plurality of items of RAW image data from a recording medium, an image development unit configured to develop the plurality of items of RAW image data included in the movie file, a display control unit configured to control a display unit to display the plurality of items of RAW image data that were developed in a display unit, and an operation unit configured to instruct a display rate of an image displayable by the display unit, wherein the image development unit executes image development by switching between a first image development processing that develops the RAW image data and a second image development processing that has a higher processing load than the first image development processing, and the image development unit switches image development processing of the RAW image data from the first image development processing to the second image development processing in response to an instruction to lower the display rate having been given by the operation unit while the RAW image data that was developed by the first image development processing is being displayed in the display unit by the display control unit.

Further features of the present invention will become apparent from the following description of exemplary embodiments (with reference to the attached drawings).

BRIEF DESCRIPTION OF THE DRAWINGS

FIG. 5 is a flowchart that shows an example of processing in a movie shooting mode according to an embodiment of the invention.

DESCRIPTION OF THE EMBODIMENTS

Below, embodiments of the present invention will be described with reference to the drawings.

First Embodiment

Figure 1:
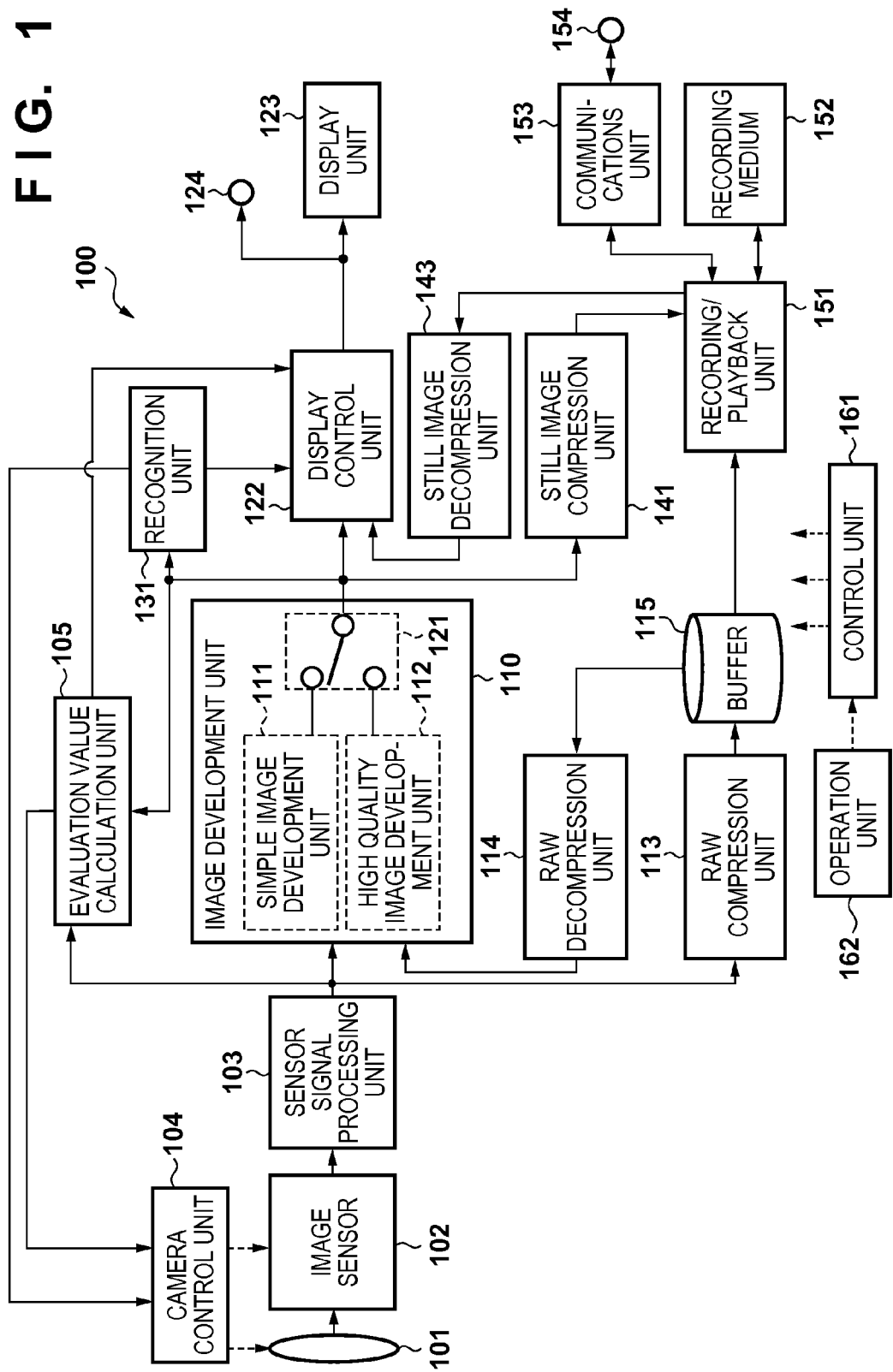
FIG. 1 is a block diagram that shows an exemplary configuration of an image capturing apparatus according to an embodiment of the invention.

FIG. 1 is a block diagram that shows an exemplary configuration of an image capturing apparatus according to a first embodiment of the invention. The image capturing apparatus 100 shown in FIG. 1 has functions of capturing an image of an object and recording the obtained image information to a recording medium, and additionally has functions of playing back the image information from the recording medium, and performing image development processing on the image information and displaying the image information, and also has functions of sending/receiving the image information to/from an external device or server (cloud), or the like. Accordingly, the image capturing apparatus according to an embodiment of the invention can represent, for example, an image processing apparatus, a recording apparatus, a playback apparatus, a recording/playback apparatus, or a communications apparatus.

As the image capturing apparatus 100, it is possible to adopt, other than a digital camera, an arbitrary information processing terminal or image capturing apparatus, such as a personal computer, a portable telephone, a smartphone, a PDA, a tablet terminal, or a digital video camera, for example. In the image capturing apparatus 100 shown in FIG. 1, except for physical devices such as an image capturing element, a display element, a recording medium, an input device, or a terminal, each block may be configured as an image processing apparatus in hardware using a dedicated logic circuit or a memory. Alternatively, this image processing apparatus may be configured in software by a computer such as a CPU executing a processing program that is stored in a memory. In these cases, the image processing apparatus can function as an apparatus that, after performing predetermined image processing on an image signal that was obtained by an image capturing element, displays the processed image signal in a display element, and records the processed image signal to a recording medium. Also, the image processing apparatus can read out the image information that was recorded to the recording medium, and display that image information in the display element.

In FIG. 1, a control unit 161 includes a CPU and a memory that stores a control program executable by the CPU, and controls processing of the image capturing apparatus 100 as a whole. An operation unit 162 includes an input device such as keys, buttons, or a touch panel used by a user to give instructions to the image capturing apparatus 100. An operation signal from the operation unit 162 is detected by the control unit 161, and is controlled by the control unit 161 such that an operation can be executed corresponding to the operation by the user. A display unit 123 includes, for example, a liquid crystal display (LCD) that displays an image that has been shot or played back, a menu screen, various information, or the like, in the image capturing apparatus 100.

When an image shooting operation is instructed to begin by the operation unit 162, an optical image of an object that is the target of image capturing is input via an optical unit 101, and formed on an image sensor 102. During image shooting, operation of the optical unit 101 and the image sensor 102 is controlled by a camera control unit 104, based on evaluation value calculation results such as aperture, focus, or hand-shake obtained by an evaluation value calculation unit 105, and object information extracted by a recognition unit 131.

Figure 7:
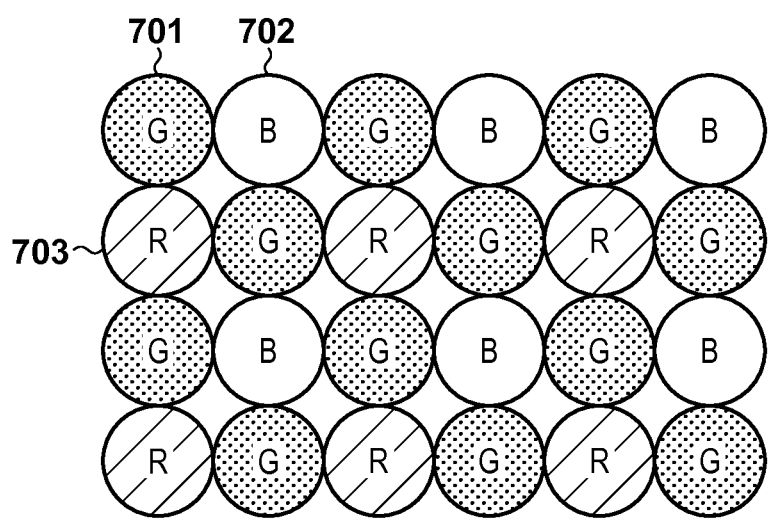
FIG. 7 illustrates a pixel array.

The image sensor 102 converts light that has been transmitted through red, green, and blue (RGB) color filters arranged for each pixel into electrical signals. FIG. 7 shows an example of the color filters provided in the image sensor 102, and shows a pixel array of an image handled by the image capturing apparatus 100. As shown in FIG. 7, the structure of this pixel array is such that red (R), green (G), and blue (B) are arranged in a mosaic for each pixel, systematically arranged side-by-side so that in each 2×2 set of four pixels there are one red pixel, one blue pixel, and two green pixels. This sort of pixel arrangement is ordinarily referred to as a Bayer array.

Pixel restoration processing by a sensor signal processing unit 103 is performed on the electrical signals that have been converted by the image sensor 102. The restoration processing includes processing performed on missing pixels or low-reliability pixels in the image sensor 102, in which pixels to be restored are interpolated using nearby pixel values, or predetermined offset values are subtracted. In the present embodiment, image information output from the sensor signal processing unit 103 is referred to as a RAW image, meaning an image that is undeveloped. After output from the sensor signal processing unit 103, a RAW image may be supplied to a later-described image development unit 111 after an unshown encoding unit has performed compression encoding on the amount of pixel information. In this case, image information obtained by decoding the compression-encoded RAW image within the later-described image development unit 111 is also referred to as a RAW image. In the present embodiment, substantially undeveloped image data is treated as RAW image data indicating a pre-development image, regardless of whether or not correction processing, compression encoding/decoding processing, or the like have been performed.

Image development processing is performed on a RAW image by an image development unit 110. The image development unit 110 has a plurality of differing image development processing units, including a simple image development unit 111 as a first image development unit and a high quality image development unit 112 as a second image development unit, and also a switch unit 121 that selects their output. The image development unit 110 performs so-called image development processing, in which debayer processing (demosaic processing) is performed on the RAW image, then the result of that processing is converted to signals including luminance and color differences, noise included in each signal is removed, optical distortion is corrected, and image adjustment is performed, for example.

More specifically, the high quality image development unit 112 performs the various processing with higher precision than the simple image development unit 111. Because the various processing is performed with higher precision, a higher quality developed image is obtained than with the simple image development unit 111, but on the other hand the processing load is greater. Consequently, the high quality image development unit 112 of the present embodiment is not specialized for real time image development performed concurrently with image shooting, but is capable of performing distributed processing over time subsequent to image shooting. By adopting a configuration in which high quality image development is performed over time after image shooting rather than at the same time as shooting, it is possible to keep circuit scale and maximum (peak) power consumption to a low level. On the other hand, the simple image development unit 111 is configured so that, although image quality is lower than with the high quality image development unit 112, image development processing can be performed at high speed during image shooting, because less processing is needed for image development than in the case of high quality image development. Because the processing load is less for the simple image development unit 111, the simple image development unit 111 is used for performing real time image development concurrently with an image shooting operation. The switch unit 121 is switched by the control unit 161, according to control corresponding to the operating content of an instruction that has been given by the user via the operation unit 162, or corresponding to an operating mode currently being executed.

In the present embodiment, a configuration is described in which the simple image development unit 111 and the high quality image development unit 112 exist independently within the image development unit 110. However, the invention also encompasses a configuration in which a single image development unit switches the operating mode, and exclusively performs the processing for simple image development or the processing for high quality image development. Predetermined display processing by a display control unit 122 is performed on the image information that has undergone image development processing by the image development unit 110, and then the processed image information is displayed in the display unit 123. After undergoing image development processing, the image information may also be output to a display device that has been externally connected via a video output terminal 124. The video output terminal 124 includes a general purpose interface, such as an HDMI or SDI interface.

The image information that has undergone image development processing by the image development unit 110 is also supplied to the evaluation value calculation unit 105. The evaluation value calculation unit 105 calculates evaluation values such as a focus state or an exposure state from the image information.

The image information that has undergone image development processing by the image development unit 110 is also supplied to the recognition unit 131. The recognition unit 131 has a function of detecting and recognizing subject information in the image information. For example, the recognition unit 131 searches for a face in a screen expressed by the image information, and if the face is detected, outputs information indicating the position of the face, and furthermore, for example, authenticates a specific person based on characterizing information such as a face.

The image information that has undergone image development processing by the image development unit 110 is supplied to a still image compression unit 141. The still image compression unit 141 is used when compressing the image information as a still image. The still image compression unit 141 performs high-efficiency encoding (compression encoding) of target image information to generate still image data having a compressed amount of information, and converts that still image data to an image file (still image file). JPEG compression or the like can be used for still image compression.

A RAW compression unit 113 performs high-efficiency encoding of the RAW image output by the sensor signal processing unit 103 using technology such as wavelet conversion or delta encoding. Also, the RAW compression unit 113 converts the encoded RAW image to compressed RAW image data, and stores this compressed RAW image data in a buffer unit (storage medium) 115. The RAW image data can be left in the buffer unit 115 and read out again, or, after being stored in the buffer unit 115, may be moved to a separate recording medium and recorded (and deleted from the buffer unit 115).

A RAW file that includes the RAW image data and a still image file that includes the developed still image data are each recorded to a recording medium 152 by a recording/playback unit 151. The recording medium 152 is an internal high-capacity memory or hard disk, or a removable memory card, for example. The recording/playback unit 151 is capable of reading out a still image file or RAW image data from the recording medium 152.

The recording/playback unit 151 is capable of writing various files to an external storage or server, or reading those files from the external storage or server, via a communications unit 153. The communications unit 153 is configured to be capable of accessing the internet or an external device via wireless communications or wired communications, using a communications terminal 154.

When a playback operation is started, the recording/playback unit 151 acquires the desired file from the recording medium 152 or via the communications unit 153, and plays back the desired file. If the file to be played back is a RAW file, the recording/playback unit 151 stores the RAW image data that has been stored in the acquired RAW file in the buffer unit 115. If the file to be played back is a still image file, the recording/playback unit 151 supplies the still image data that has been stored in the acquired still image file to a still image decompression unit 143.

A RAW decompression unit 114 reads out the RAW image data that has been stored in the buffer unit 115, and decodes the compressed RAW image data to decompress that RAW image data. The RAW image data that has been decompressed by the RAW decompression unit 114 is supplied to the image development unit 110. The still image decompression unit 143 decodes the still image data that has been input to decompress that still image data, and supplies the decompressed still image data to the display control unit 122 as a still image playback image.

Figure 2:
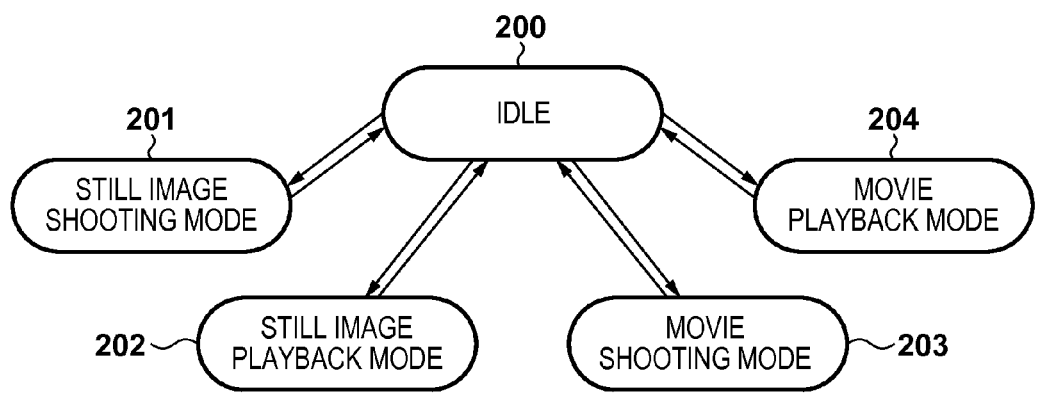
FIG. 2 is an exemplary state transition diagram of an image capturing apparatus according to an embodiment of the invention.

Next is a detailed description of operating modes of the image capturing apparatus 100 of the present embodiment, with reference to the accompanying drawings. FIG. 2 is a state transition diagram that shows transitions in operating modes of the image capturing apparatus 100. Such mode transitions are executed according to a user operation instruction from the operation unit 162, or a determination by the control unit 161. A user operation may manually cause a transition to occur, or a transition may occur automatically. As shown in FIG. 2, the image capturing apparatus 100 operates by appropriately switching, via an idle state 200, among four modes: a still image shooting mode 201, a still image playback mode 202, a movie shooting mode 203, and a movie playback mode 204.

Still Image Shooting Mode 201

First, the still image shooting mode 201 will be described. In the still image shooting mode 201, for example in response to a shooting instruction, image information that has undergone image development processing by the simple image development unit 111 is supplied to the still image compression unit 141, and a still image file is generated as a simple image by high-efficiency encoding processing (still image compression). The still image compression unit 141 performs compression processing using publicly known still image compression technology such as JPEG compression, and the recording/playback unit 151 records the still image file to the recording medium 152. Also, the RAW compression unit 113 performs high-efficiency encoding (RAW compression) on the RAW image data that has been output from the sensor signal processing unit 103 corresponding to the still image that has been shot. The RAW image data in a state compressed using RAW compression is stored in the buffer unit 115. In this example, the high-efficiency encoding performed by the RAW compression unit 113 is processing performed using publicly known technology such as wavelet conversion or delta encoding, but reversible encoding or irreversible encoding may also be used. Alternatively, RAW compression by the RAW compression unit 113 may be omitted, so that the RAW image data is output in a pass-through manner, in an uncompressed state. Regardless of whether or not RAW compression is performed, in the present embodiment, restorable RAW image data is generated as a high quality image, without much loss of the image information supplied from the sensor signal processing unit 103. The recording/playback unit 151 records a RAW file that includes the RAW image data to the recording medium 152.

Figure 3A:
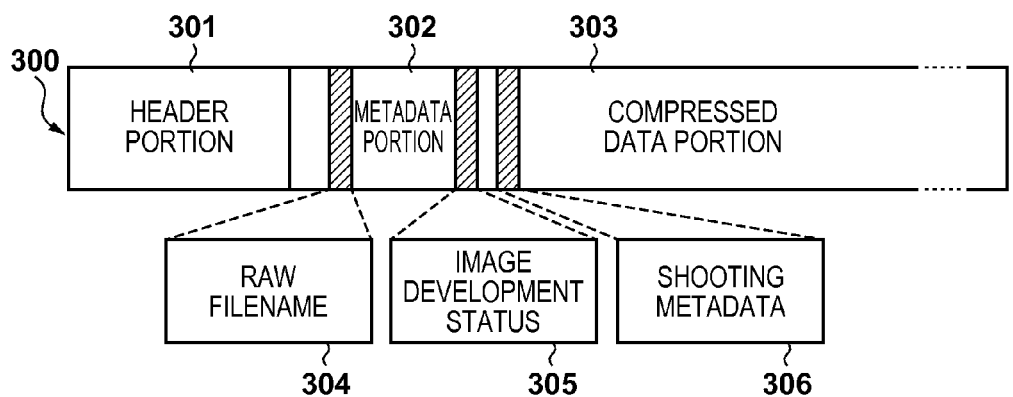
FIGS. 3A to 3C show an exemplary configuration of a still image file, a RAW file, and a movie file according to an embodiment of the invention.
Figure 3B:
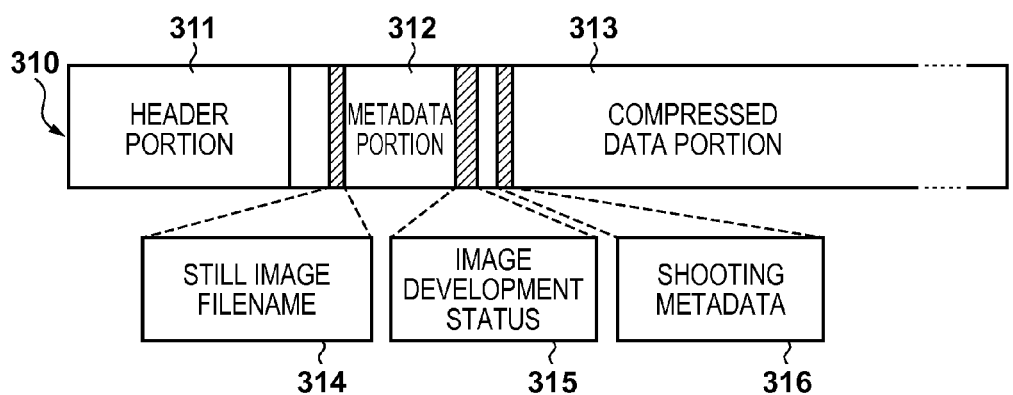
Figure 3C:
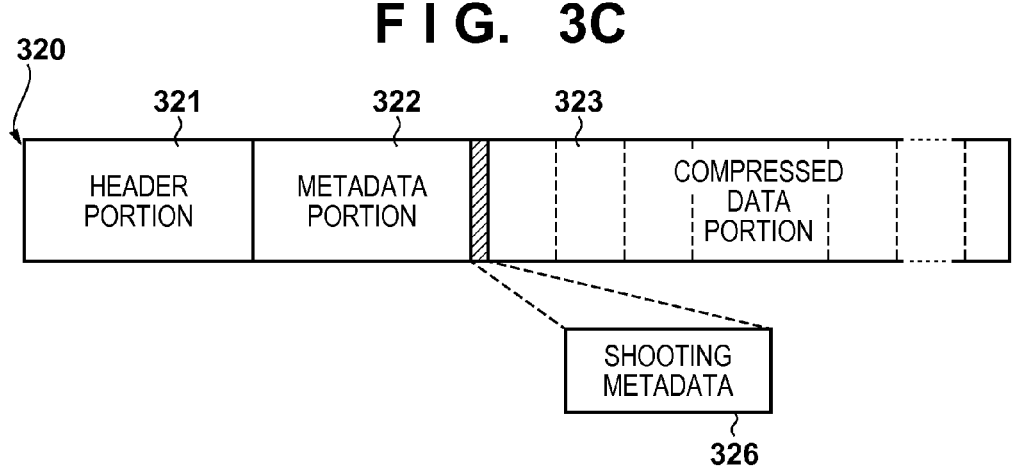

Next is a description of the structure of a still image file and the structure of a RAW file according to the present embodiment. FIGS. 3A to 3C show an exemplary configuration of a still image file and a RAW file. A still image file 300 shown in FIG. 3A, for example, has been recorded in a predetermined recording area of the recording medium 152 by the recording/playback unit 151. The still image file 300 includes a header portion 301, a metadata portion 302, and a compressed data portion 303. The header portion 301 includes an identification code or the like that indicates that the file type of this file is a still image file. The compressed data portion 303 includes compressed data of a still image that has undergone high-efficiency encoding.

The metadata portion 302 includes a filename information 304 of a RAW file that includes RAW image data corresponding to the still image data that has been stored in this still image file. Also, the metadata portion 302 includes an image development status information 305 that includes a flag that indicates whether this still image file includes still image data that has undergone simple image development by the simple image development unit 111, or includes still image data that has undergone high quality image development by the high quality image development unit 112. Also, the metadata portion 302 includes a shooting metadata 306 that includes evaluation values and subject information that have been detected by the evaluation value calculation unit 105 and the recognition unit 131, and information related to shooting from the optical unit 101 and the image sensor 102 (for example, such as lens type identification information or sensor type identification information). Also, although not shown, the metadata portion 302 may further include, for example, an identification code of a recording medium where a corresponding RAW file is recorded, or path information of a folder where a corresponding RAW file is recorded.

A RAW file 310 shown in FIG. 3B has been stored in the buffer unit 115, or has been recorded by the recording/playback unit 151 in a predetermined recording area of the recording medium 152, for example. When RAW image data is stored in the buffer unit 115, the respective items of data do not necessarily have to be stored in a file format in the order shown in FIG. 3B. Also, the RAW image data and the information in the header portion and the metadata portion may be held in the buffer unit 115 even after recording to the recording medium 152. The RAW file 310 includes a header portion 311, a metadata portion 312, and a compressed data portion 313. The header portion 311 includes an identification code or the like that indicates that the file type of this file is a RAW file. The compressed data portion 313 includes compressed RAW image data that has undergone high-efficiency encoding (or may alternatively include uncompressed RAW image data).

The metadata portion 312 includes a filename information 314 of a still image file that includes still image data that was generated by performing image development processing on the RAW image data included in this RAW file. Also, the metadata portion 312 includes an image development status information 315 that includes a flag that indicates whether the still image data included in this still image file has undergone simple image development by the simple image development unit 111, or has undergone high quality image development by the high quality image development unit 112. Also, the metadata portion 312 includes a shooting metadata 316 that includes evaluation values and subject information that have been detected by the evaluation value calculation unit 105 and the recognition unit 131, and information related to shooting from the optical unit 101 and the image sensor 102 (for example, such as lens type identification information or sensor type identification information).

Also, although not shown, the metadata portion 312 may further include, for example, an identification code of a recording medium where the RAW file is recorded, or path information of a folder where the RAW file is recorded. An identification code of a recording medium where a corresponding still image file is recorded, or path information of a folder where a corresponding still image file is recorded, for example, may also be included. Alternatively, the still image file itself may be converted to metadata, and stored in the metadata portion 312. Note that the structures of the various files according to the present embodiment described above are only examples, and a configuration based on a reference standard such as DCF or EXIF may also be adopted.

Because the still image data that has undergone image development processing in the still image shooting mode has undergone simple image development by the simple image development unit 111, there are no more than 2,000,000 pixels, or part of image development processing has been omitted, for example, so image quality is limited. Therefore, while the still image shooting mode is effective for generally confirming the content of image shooting, it may be insufficient for the purpose of confirming fine details of an image or image printing. On the other hand, although the RAW image data has high image quality with not much loss of the image information supplied from the sensor signal processing unit 103, this data has not yet undergone image development processing, so display or printing in that state is difficult. Image development processing is necessary for display or printing, and image development takes time. Also, ordinarily RAW image data is in a format unique to the manufacturer, and so the playback environment that can handle the RAW image data is limited.

Consequently, after finishing an image shooting operation, in the idle state 200, "following image development" is performed in which image development processing is carried out again with high image quality on the RAW image data that is being held in the buffer unit 115, or the RAW image data that has been stored in the RAW file that was recorded to the recording medium 152 or the like, thus generating a high quality display image or high quality still image data. When the following image development is executed, the RAW image data that has already been recorded is read out, and image development processing is performed with high image quality by the high quality image development unit 112. Then, the still image data that was obtained by performing the high quality image development processing is recorded to the recording medium 152 or the like. This sort of following image development is executed in a state awaiting user operation, in which the processing load of the apparatus is comparatively small, such as in an interval between shots, in playback mode, or in a sleep state. The still image files that include the still image data obtained by simple image development during shooting are successively replaced with still image files that include still image data obtained by high quality image development. The following image development does not need to be a manual operation, and a design may be possible in which the control unit 161 automatically causes the following image development to be executed. By adopting such a configuration, afterward, even when playback with high image quality is needed, such as when displaying an image to confirm fine details or when printing an image, unnecessary image development processing does not occur each time. Moreover, the high quality still image file can be employed in an ordinary environment like that used for a conventional still image file.

Still Image Playback Mode 202

Next is a description of the still image playback mode 202. In the still image playback mode 202, it is determined whether or not an instruction to perform enlarged display of a still image to be played back has been received from the user. If an enlargement instruction has not been received, the still image decompression unit 143 decodes the still image data included in the still image file to decompress that still image data, and the display control unit 122 outputs a display image to the display unit 123. On the other hand, if an enlargement instruction was received, if the still image data included in the still image file has not undergone high quality image development, high quality image development by following image development is executed. The size (number of pixels) of an image that has undergone image development processing, generated by the high quality image development unit 112, is the entire size that was read out from the image sensor 102, or alternatively is a size that has been set by the user, and has markedly higher image quality than an image obtained via simple image development, which is limited to no more than 2,000,000 pixels. Accordingly, in the case of a still image that has been developed with the high quality image development unit 112, it is possible to answer a request for enlarged display with sufficiently high quality. Also, still image files that include still image data obtained by simple image development are successively replaced with still image files that include still image data obtained by high quality image development.

Figure 4A:
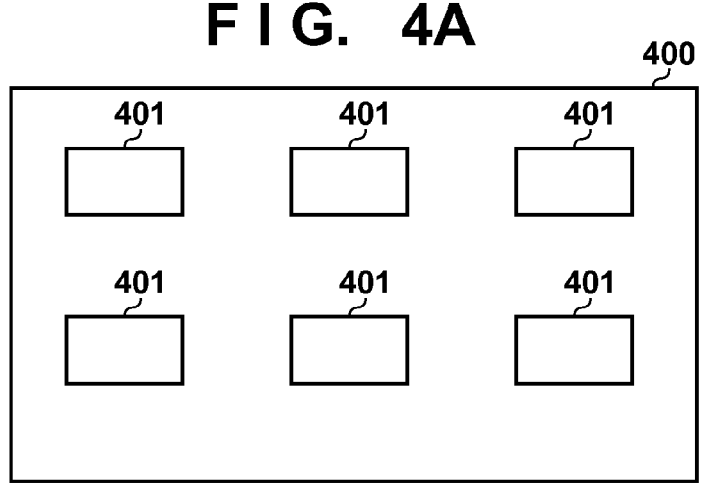
FIGS. 4A to 4C show exemplary displays of a still image playback mode according to an embodiment of the invention.
Figure 4B:
Figure 4C:

Next is a description of various modes of display, including enlarged display, with reference to FIGS. 4A to 4C. FIGS. 4A to 4C show examples of display processing in the still image playback mode according to the present embodiment. In a display example 400 shown in FIG. 4A, six images indicated by reference numeral 401 are displayed in a reduced manner (list display) in the display unit 123. In a display example 410 shown in FIG. 4B, all of a particular image 411 is shown in the display unit 123, and this mode of display is referred to as normal display. In a display example 420 shown in FIG. 4C, an image 421 that is an enlargement of a partial region of a particular image is displayed in an enlarged manner in the display unit 123. Enlarged display of details of an object such as in the display example 420 is ordinarily used when, for example, checking for appropriate focus immediately after shooting an image.

Movie Shooting Mode 203

Next is a description of operation in the movie shooting mode 203 of the image capturing apparatus 100. FIG. 5 shows a flowchart of processing in the movie shooting mode of the present embodiment. The flowchart in FIG. 5 shows a processing procedure in which respective processing blocks are controlled and executed by the control unit 161, and is realized by opening a program that has been stored in a memory (ROM) of the control unit 161 into a memory (RAM), and a CPU executing that program.

In FIG. 5, when the processing of the movie shooting mode is started, in S501 the control unit 161 determines whether or not a processing load state of the image capturing apparatus 100 is low. At a frequency corresponding to the load state, if the processing load is low then processing moves to the idle state in S520, otherwise processing proceeds to S502. For example, processing always proceeds to S502 in the case of a movie having a high number of pixels suitable for a horizontal resolution of 4000 pixels (4 k), or in the case of a movie having a high frame rate such as 120 frames per second (120 P), because the processing load is high. In the case of settings to shoot a movie at a number of pixels less than a predetermined value, or at a frame rate less than a predetermined speed, processing may move to S520 in an interval between processing of a first frame and a second frame that are adjacent in the movie, for example at a half frequency.

In S502, the camera control unit 104 controls operation of the optical unit 101 and the image sensor 102 to perform movie shooting with predetermined conditions. For example, according to zoom and focus instructions from the user, a lens included in the optical unit 101 is moved, and a read region of the image sensor 102 is set according to an instruction of the number of pixels for shooting. Also, focus adjustment, tracking, or the like of a specific subject is controlled based on evaluation value information and subject information supplied from the evaluation value calculation unit 105 and the recognition unit 131, described later.

In S503, the sensor signal processing unit 103 performs signal processing for pixel restoration on electrical signals that have been converted by the image sensor 102. Here, for the values of missing pixels or low-reliability pixels, pixels are interpolated using nearby pixel values, or predetermined offset values are subtracted. In the present embodiment, image information that is output from the sensor signal processing unit 103 after finishing the processing in S503 is referred to as a RAW image.

In S504, the simple image development unit 111 performs image development processing on RAW images. At this time, the control unit 161 switches the switch unit 121 in the image development unit 110, to select output of the image information that has undergone image development processing by the simple image development unit 111. The simple image development unit 111 performs simple image development processing on RAW images that make up each frame of a movie, such as debayer processing (demosaic processing), conversion to signals including luminance and color differences, removal of noise included in each signal, correction of optical distortion, image adjustment, and the like. The simple image development unit 111 realizes high speed processing or simple processing for image development by limiting the image size after development to, for example, no more than the 2,000,000 pixels of HD video, limiting the processing in noise removal or optical distortion correction, or omitting such processing. By the simple image development unit 111 performing processing at reduced image size or partially limiting the functions in image development processing, the image capturing apparatus 100 can realize, for example, image development of a movie at HD size with a small circuit scale and low power consumption.

The image information that has undergone image development processing by the simple image development unit 111 is supplied to the evaluation value calculation unit 105. In S505, the evaluation value calculation unit 105 calculates evaluation values such as a focus state or an exposure state from a luminance value or a contrast value or the like included in image information. The evaluation value calculation unit 105 may also acquire a RAW image prior to image development processing, and similarly calculate evaluation values from that RAW image.

Also, the image information that has undergone image development processing by the simple image development unit 111 is supplied to the recognition unit 131. In S506, the recognition unit 131 detects a subject (such as a face) from the image information to recognize subject information. For example, the recognition unit 131 detects whether a face is present in the image information, detects the position of that face, or authenticates a specific person, for example, and outputs the result as information.

Also, the image information that has undergone image development processing by the simple image development unit 111 is supplied to the display control unit 122. In S507, the display control unit 122 forms a display image from the acquired image information, outputs the display image to the display unit 123 or an external display device, and displays the display image. The display image displayed by the display unit 123 is used for confirmation display for the user to perform framing of a subject. Specifically, in a usage specific to movie shooting, the display image is used for a live view display for performing framing of a subject not only before starting recording of a movie that has been shot (in a standby state), but also during recording of a movie (in a recording state). Also, the display image may be displayed from the display control unit 122, via the video output terminal 124, onto another display device such as an external television. Furthermore, the display control unit 122 can apply the evaluation value information or subject information supplied from the evaluation value calculation unit 105 or the recognition unit 131 by, for example, displaying a mark indicating an in-focus region in the display image, or displaying a frame at the position of a face that was recognized.

In S508, the control unit 161 determines whether or not an instruction to start recording was received from the user and a shot movie is now being recorded. If determined that a shot movie is now being recorded, processing proceeds to S510, and if determined that a shot movie is not now being recorded (if in a standby state), processing returns to S501, and the shooting operation and live view display prior to starting movie recording is repeated. Thus, within a movie that has been shot, RAW image data of the period to be recorded from the start of recording to the end of recording is supplied from the sensor signal processing unit 103 to the RAW compression unit 113. In S510, the RAW compression unit 113 performs high-efficiency encoding (RAW compression) of the supplied RAW image data. The RAW image data that has been compressed by RAW compression is stored in the buffer unit 115. The high-efficiency encoding performed by the RAW compression unit 113 is processing performed using publicly known technology such as wavelet conversion or delta encoding, but reversible encoding or irreversible encoding may also be used. Alternatively, RAW compression by the RAW compression unit 113 may be omitted, so that RAW images are output in a pass-through manner, in an uncompressed state. Regardless of whether or not RAW compression is performed, in the present embodiment, a restorable RAW file is generated as a high image-quality file, without much loss of the image information supplied from the sensor signal processing unit 103.

In S511, the recording/playback unit 151 records the RAW file that includes the RAW image data to the recording medium 152, and then the flow of processing moves to S501. Also note that, although omitted from the description with reference to the drawings, voice information that was input by an unshown microphone was acquired at the same time as shooting the movie. Voice information of the period to be recorded is recorded associated with RAW images. Also, in S511, the recording/playback unit 151 may, via the communications unit 153, send the RAW file from the communications terminal 154 to an external storage and record the RAW file using the external storage. The foregoing was a description of the flow of processing in the movie shooting mode of the present embodiment.

Next is a description of the structure of a RAW file according to the present embodiment, with reference to FIG. 3C.

A RAW file 320 shown in FIG. 3C has been recorded by the recording/playback unit 151 in a predetermined recording area of the recording medium 152, for example. The RAW file 320 includes a header portion 321, a metadata portion 322, and a compressed data portion 323. The header portion 321 includes an identification code or the like that indicates that the file type of this file is a RAW file. The compressed data portion 323 includes movie RAW image data that has undergone high-efficiency encoding (or may alternatively include uncompressed movie RAW image data).

The metadata portion 322 includes a shooting metadata 326 that includes evaluation values and subject information that have been detected by the evaluation value calculation unit 105 and the recognition unit 131, and information related to shooting from the optical unit 101 and the image sensor 102 (for example, such as lens type identification information or sensor type identification information). Note that the structure of the various files according to the present embodiment described above is only an example, and a configuration based on a reference standard such as DCF, AVCHD, or MXF may also be adopted.

As described above, in the image capturing apparatus 100 according to the present embodiment, shooting image display (live view display) in the movie shooting mode, and image development processing for generating evaluation values, are performed by the simple image development unit 111. The simple image development unit 111, by limiting the image size after development to, for example, no more than 2,000,000 pixels, limiting the processing in noise removal or optical distortion correction, or omitting such processing, is able to realize image development processing of, for example, a movie at HD size with a small circuit scale and low power consumption. On the other hand, the image capturing apparatus 100 according to the present embodiment generates a RAW file corresponding to the recording period. The RAW file is a high image quality file without much loss of image information supplied from the sensor signal processing unit 103, but image development processing is not necessary to generate this file. Therefore, it is possible to record the RAW file with a small-scale circuit and low power consumption even when increasing the number of pixels in an image to a resolution such as 4K or 8K (suitable for a horizontal resolution of 8000 pixels), or when increasing the frame rate to a frame rate such as 120 frames per second (120 P).

Movie Playback Mode 204

Figure 6:
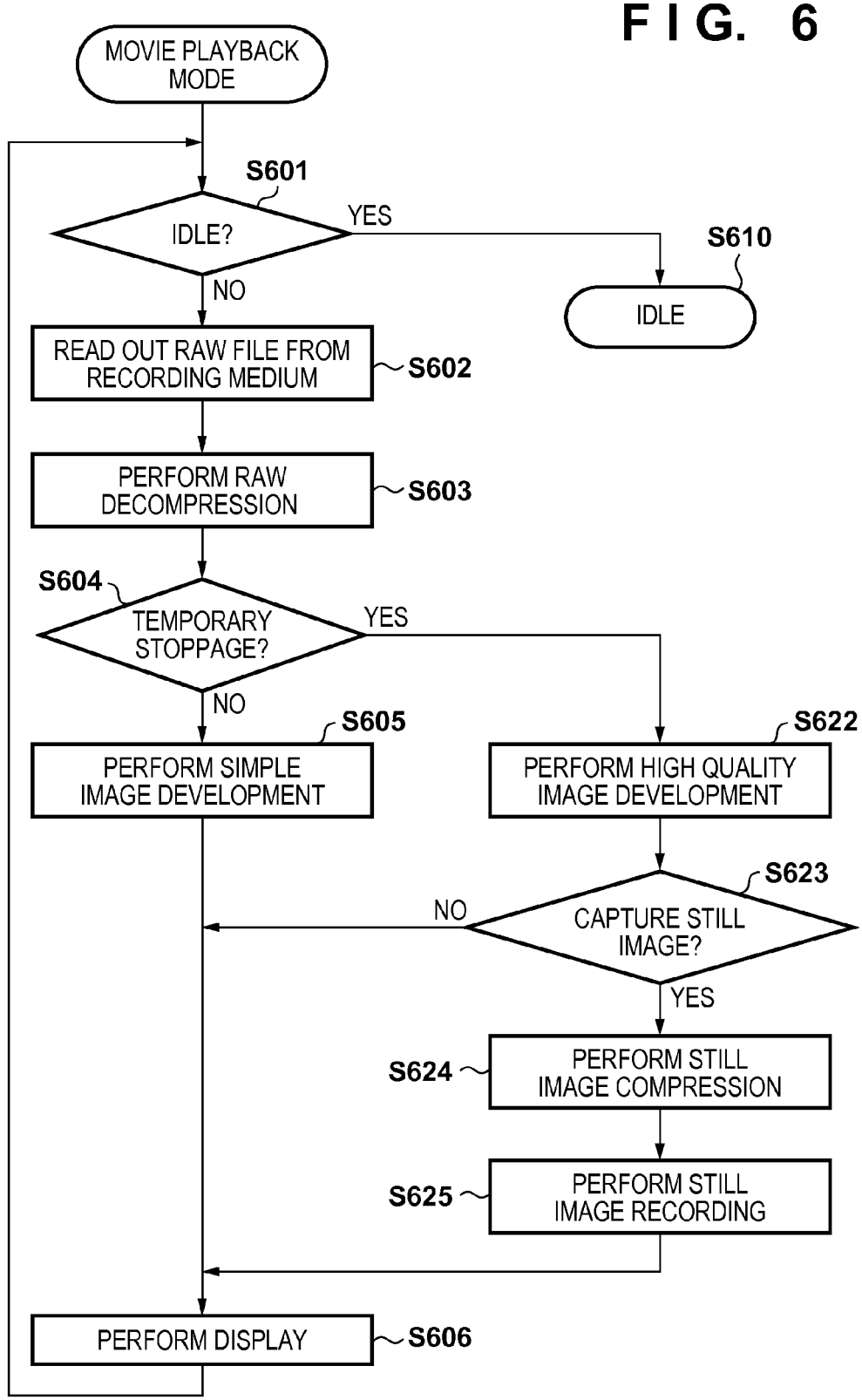
FIG. 6 is a flowchart that shows an example of processing in a movie playback mode according to an embodiment of the invention.

Next is a description of operation in the movie playback mode 204 of the image capturing apparatus 100. FIG. 6 shows a flowchart of processing in the movie playback mode of the present embodiment. The flowchart in FIG. 6 shows a processing procedure in which respective processing blocks are controlled and executed by the control unit 161, and is realized by opening a program that has been stored in a memory (ROM) of the control unit 161 into a memory (RAM), and a CPU executing that program.

In FIG. 6, when the processing of the movie playback mode is started, in S601 the control unit 161 determines whether or not a processing load state of the image capturing apparatus 100 is low. At a frequency corresponding to the load state, if the processing load is low then processing moves to the idle state in S610, otherwise processing proceeds to S602. For example, while awaiting a user operation such as a playback instruction, the processing load is low, so processing moves to S610. When movie playback has been started according to an operation from the user (including a state during playback), processing proceeds to S602.

In S602, the recording/playback unit 151 reads out the RAW file to be played back from the recording medium 152 or the like. Then, in S603, the RAW decompression unit 114 decodes and decompresses the RAW file frame-by-frame. In S604, the control unit 161 determines whether or not an instruction to temporarily stop (pause) playback of the movie played back has been received from the user. If a temporary stop (pause) instruction has not been received in S604, movie playback is continued so the flow of processing proceeds to S605.

In S605, the simple image development unit 111 performs image development processing on RAW images. At this time, the control unit 161 switches the switch unit 121 in the image development unit 110, to select output of the image information that has undergone image development processing by the simple image development unit 111. The simple image development unit 111 performs simple image development processing on the RAW images that make up each frame of a movie, such as debayer processing (demosaic processing), conversion to signals including luminance and color differences, removal of noise included in each signal, correction of optical distortion, image adjustment, and the like. The image information that has undergone image development processing by the simple image development unit 111 is supplied to the display control unit 122. In S606, the display control unit 122 forms a display image from the acquired image information, outputs the display image to the display unit 123 or an external display device, and displays the display image.

Figure 8A:
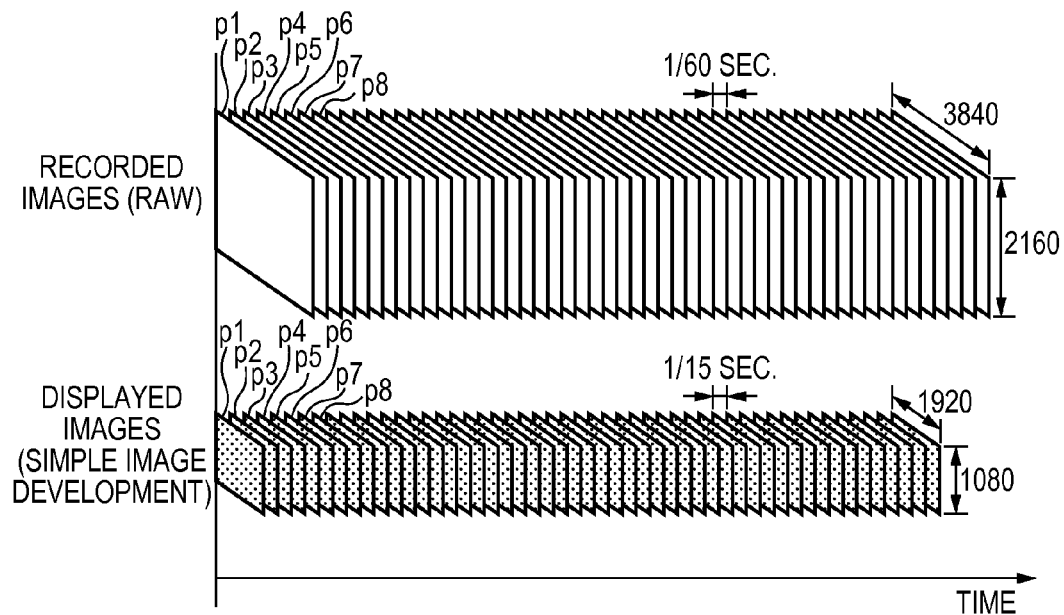
FIGS. 8A and 8B show exemplary schematic views relating to display in a movie playback mode according to an embodiment of the invention.

Here, as one example, it is assumed that the RAW image data is recorded at a frame rate of 60 frames per second in frames of 3840×2160 pixels, and in order to suppress circuit scale the simple image development unit 111 is capable of performing processing at a frame rate of 60 frames per second in frames of 1920×1080 pixels. An example of playback images of a movie RAW file in this case is shown in FIG. 8A. In FIG. 8A, p1, p2, p3 . . . indicate respective frame numbers of the RAW image data, but for simplicity, a reference numeral is not assigned to every frame. A frame having 1920×1080 pixels may be generated by reducing a frame having 3840×2160 pixels, or may be generated by extracting a portion of a frame having 3840×2160 pixels. The processing performance of the above simple image development unit 111 is the maximum number of pixels that can be processed per unit time, and for example, the simple image development unit 111 can process 15 frames per second with each frame having 3840×2160 pixels.

Figure 8B:
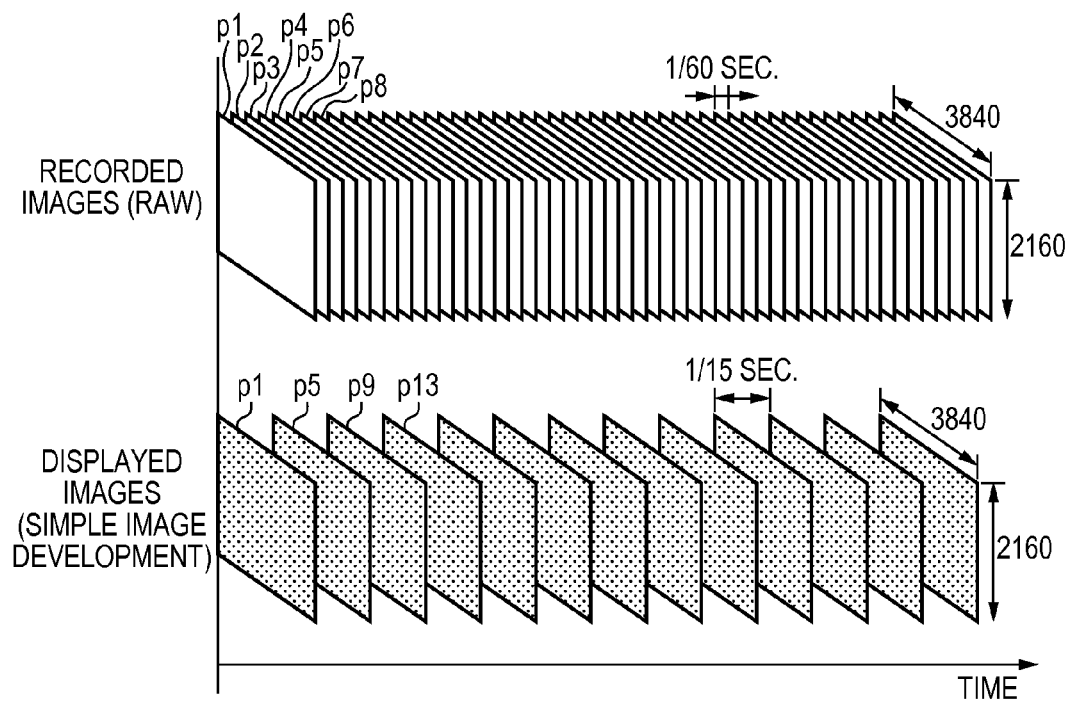

FIG. 8B shows an example of performing image development with the simple image development unit 111 and displaying images by lowering the display rate of frames without changing the resolution of display images. In FIG. 8B, only every fourth frame is displayed, and the frames in between are dropped. Frame numbers of corresponding RAW image data are assigned as the frame numbers of these display images. Also, "display rate" is a concept that corresponds to the speed of switching the display image. With 60 images switched per second in normal playback, the number of images displayed per second grows smaller as the display rate slows. For example, at a display rate of ½ normal playback, 30 images are switched per second. By continuing to reduce the display rate, ultimately a state is reached in which there is no image switching, i.e., a temporarily stopped state.

In this way, when, for example, the display rate is changed by receiving an instruction to change the display rate using an operation by the operation unit 162, even though the same simple image development is performed, it is possible to change the frame size and perform image development processing on a frame having a large size instead of performing image development processing on a plurality of frames having a small size. Also, as described below, when the display rate is changed to temporarily stop playback (that is, when image development processing of 60 frames of RAW image data per second is necessary, so development of a single image in a temporarily stopped state is permitted), image development processing of RAW image data may be switched from simple image development processing to high quality image development processing.

Returning to the description of FIG. 6, when a temporary stop instruction has been received via the operation unit 162 in S604, the flow of processing is moved to S622 in order for the control unit 161 to put the movie currently in playback and display into a temporarily stopped state, and display the frame at the stopped position when the temporary stoppage was performed as a still image. In the temporarily stopped state, an image is displayed as a still image, so details of image quality are more easily seen than when an image is moving. Moreover, it is conceivable that an instruction for enlarged display is likely to be received during a temporary stoppage. Consequently, in order to provide display of a higher quality image than an image that has undergone simple image development, high quality image development processing by the high quality image development unit 112 is performed on a restored RAW image.

The image capturing apparatus 100 can also newly capture high quality still image data that corresponds to the frame being displayed during the temporary stoppage, which has undergone high quality image development from the RAW image data of the movie in this way. In S623, the control unit 161 determines whether or not a capture instruction has been received from the user via the operation unit 162, using the display image at the stopped position as a still image. If a still image capture instruction has not been received in S623, still image data that has undergone high quality image development from the RAW image data of the movie is supplied to the display control unit 122, and in S606, the display control unit 122 outputs a display image of the still image data that has undergone high quality image development to the display unit 123. By this processing, an image displayed during the temporary stoppage from the movie file is replaced by the display image of still image data that has undergone high quality image development from the RAW image data.

If a still image capture instruction has been received in S623, in S622 the image information that has undergone image development processing by the high quality image development unit 112 is supplied to the still image compression unit 141. In S624, the still image compression unit 141 executes high-efficiency encoding processing (still image compression) on the image information that was acquired by the capture. The still image compression unit 141 performs compression encoding using publicly known technology such as JPEG compression.

After the recording/playback unit 151 records the still image file that includes the high quality still image data to the recording medium 152 or the like in S625, the flow of processing moves to S606. The still image data that has undergone high quality image development from the RAW image data included in the RAW file of the movie is supplied to the display control unit 122, and in S606, the display control unit 122 outputs a display image of the still image data that has undergone high quality image development to the display unit 123. By this processing, an image displayed during the temporary stoppage from the movie file is replaced by the display image of still image data that has undergone high quality image development from the RAW image data.

The still image file that includes the high quality still image data generated by the still image compression unit 141 in S624 has the configuration of the still image file 300 shown in FIG. 3A. The filename of the movie RAW file used as the basis for the capture is stored in the metadata portion 302, as RAW file filename information 304. Time information of the frame that was captured as a still image is stored as the shooting metadata 306, so it is possible to indicate a corresponding frame position of the movie RAW file. Also, a corresponding frame of the movie RAW file may be extracted as a still image, and a new RAW file 310 created that pairs with that still image. Regarding generation of a still image RAW file, a still image file and a RAW file are configured by a method as described in the above still image shooting mode with reference to numerals 310 to 313.

The display in S606 is performed for each single frame, and during movie playback, display of the next frame is performed, so the flow of processing returns to S601. In S601, when processing has moved to the idle state in S610, the above-described following image development processing is executed, for example.

In this way, the image capturing apparatus 100 of the present embodiment, using simple image development, is able to play back a movie with a small circuit scale and low power consumption, and in a temporarily stopped state, can substitute a still image that was developed with high image quality. Furthermore, this high quality still image can easily be captured in a still image file.

Above, a case of temporary stoppage was described in connection with a method for changing the display rate, but also in a case of frame advance in which the display image is switched after a temporary stoppage, RAW image data to be displayed after switching may undergo high quality image development and then be displayed, in a similar manner as described above.

Second Embodiment

In the case described in the first embodiment, from a normal playback state in which image development processing of RAW image data at 60 frames per second is necessary, by altering the display rate of frame images, the image processing apparatus changes to a state used during a temporary stoppage, in which it is permitted to develop a single image. In this state, image development processing performed on RAW image data is switched from simple image development processing to high quality image development processing. However, changing of the display rate is not limited to being performed during a temporary stoppage, and may also be performed when reducing playback speed, i.e., during slow playback.

Consequently, in the case described in this second embodiment, an instruction for slow playback has been given during movie playback. The configuration of the image capturing apparatus according to the present embodiment is similar to the configuration described in the first embodiment (see FIG. 1), and here, mainly differences from the first embodiment will be described.

Figure 9:
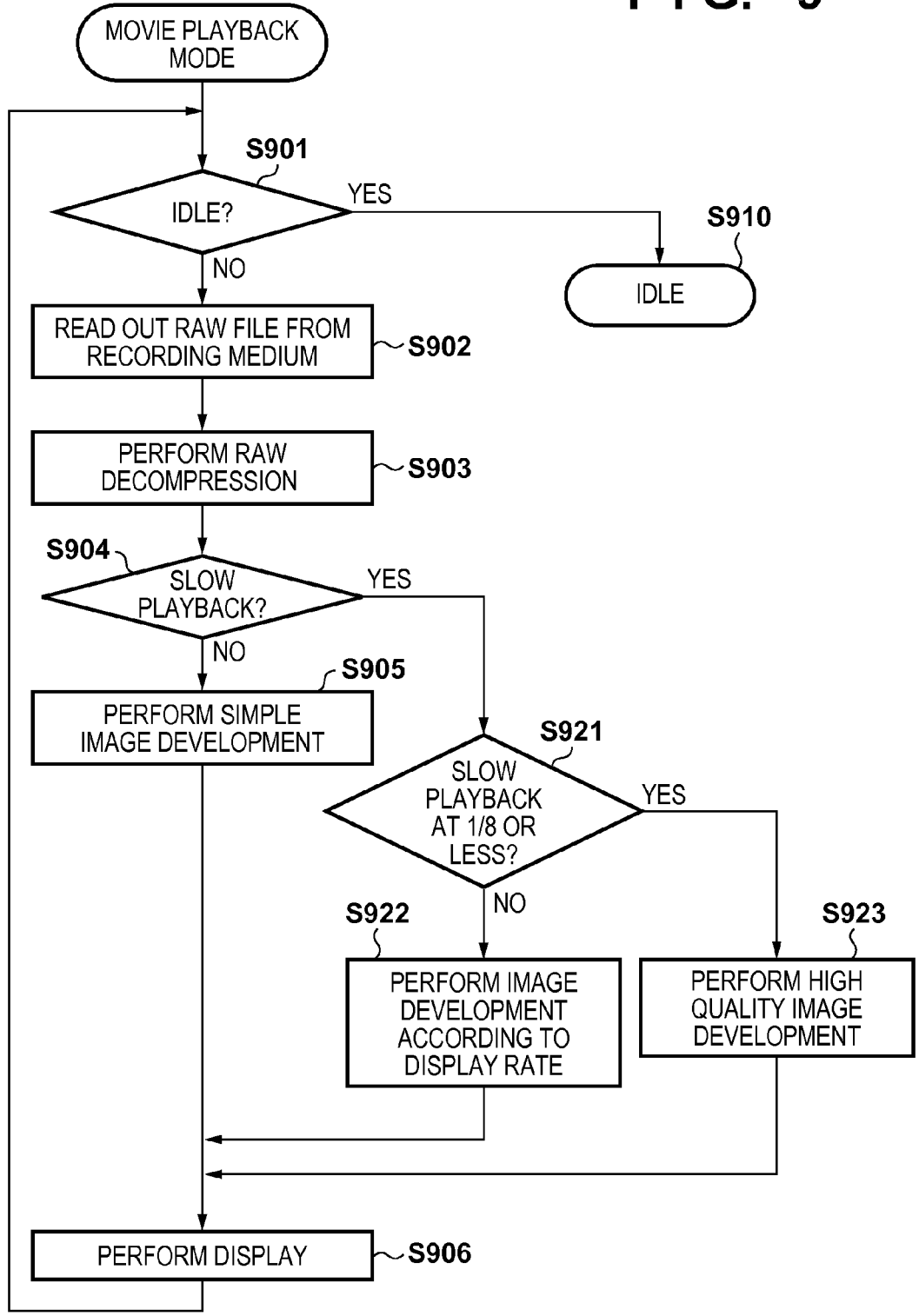
FIG. 9 is a flowchart that shows another example of processing in a movie playback mode according to an embodiment of the invention.

Next is a description of operation in the movie playback mode of the image capturing apparatus 100. FIG. 9 shows a flowchart of processing in the movie playback mode of the present embodiment. The flowchart in FIG. 9 shows a processing procedure in which respective processing blocks are controlled and executed by the control unit 161, and is realized by opening a program that has been stored in a memory (ROM) of the control unit 161 into a memory (RAM), and a CPU executing that program.

In FIG. 9, when the processing of the movie playback mode is started, in S901 the control unit 161 determines whether or not a processing load state of the image capturing apparatus 100 is low. At a frequency corresponding to the load state, if the processing load is low then processing moves to the idle state in S910, otherwise processing proceeds to S902. For example, while awaiting a user operation such as a playback instruction, the processing load is low, so processing moves to S910. When movie playback has been started according to an operation of the operation unit 162 from the user (including a state during playback), processing proceeds to S902.

In S902, the recording/playback unit 151 reads out the RAW file to be played back from the recording medium 152 or the like. Then, in S903, the RAW decompression unit 114 decodes and decompresses the RAW file frame-by-frame. In S904, the control unit 161 determines whether or not an instruction to perform slow playback of the movie played back has been received from the user. If a slow playback instruction has not been received in S904, movie playback is continued so the flow of processing proceeds to S905.

In S905, the simple image development unit 111 performs image development processing on RAW images. At this time, the control unit 161 switches the switch unit 121 in the image development unit 110, to select output of the image information that has undergone image development processing by the simple image development unit 111. The image information that has undergone image development processing by the simple image development unit 111 is supplied to the display control unit 122. In S906, the display control unit 122 forms a display image from the acquired image information, outputs the display image to the display unit 123 or an external display device, and displays the display image.

If a slow playback instruction has been received via the operation unit 162 in S904, processing proceeds to S921, and the control unit 161 determines whether or not the display rate change instruction for slow playback from the user was ⅛ or less. In the state of slow playback, the display rate is slower than during normal playback, and in the present embodiment, as an example, it is assumed that a change instruction can be given by designating a display rate of any of ½, ¼, and ⅛. In this case, in S904, the control unit 161 determines whether or not the slowest display rate among the designatable display rates has been designated. If, hypothetically, a rate of ¹⁄₁₆ or slower is included among the designatable display rates, in S904, the control unit 161 may determine whether or not a display rate of a predetermined rate or less (⅛ or less) has been designated. The predetermined rate can be decided according to the performance of image development processing in the image development unit 110. Thus, image update time is lengthened, so details of image quality are more easily seen than during normal playback. Therefore, a configuration is adopted that provides display of a higher quality image than an image that has undergone simple image development.

In S921, if determined that the display rate for slow playback is ⅛ or less, there is sufficient time to perform high quality image development, so processing moves to S923, and high quality image development processing by the high quality image development unit 112 is performed on the restored RAW image data. In S906, the display control unit 122 forms a display image from the image information that has undergone image development processing, outputs the display image to the display unit 123 or an external display device, and displays the display image.

If determined in S921 that the display rate for slow playback is greater than ⅛, in S922, according to the display rate for slow playback, image development processing is performed so as to produce higher image quality than the simple image development used in the case of normal playback. For example, when the display rate is ½, the image update period is twice as much time as in the case of normal playback, so twice as much time can be taken for image development processing. Consequently, a frame of 3840×2160 pixels that was developed after reduction to 1920×1080 pixels in normal playback, here is developed after reduction to 2560×1440 pixels. Also, in a case where the display rate is ¼, four times as much time can be taken for image development processing, so a frame having 3840×2160 pixels, which is the same as the original frame size of the RAW image data, is developed without a reduction in size.

Figure 10:
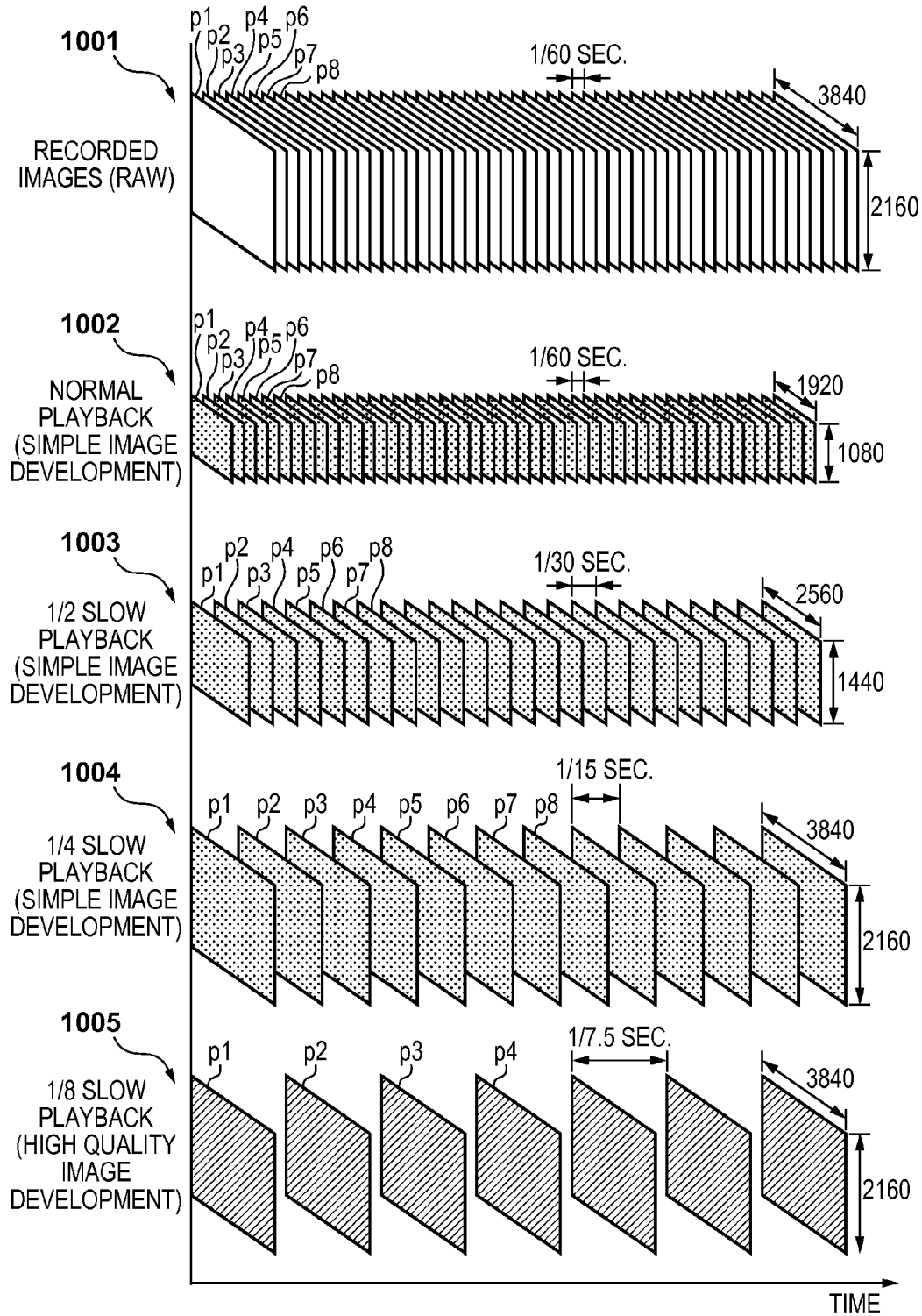
FIG. 10 illustrates an example of switching image development processing during slow playback display according to an embodiment of the invention.

FIG. 10 schematically shows display frames corresponding to the various display rates described above. In the case shown in FIG. 10, RAW images are recorded at a frame rate of 60 frames per second, with each frame having 3840×2160 pixels (an aspect ratio of 16×9). In the case shown in FIG. 10, the simple image development unit 111 processes frames having 1920×1080 pixels at 60 frames per second, in order to suppress the circuit scale. Note that with the processing performance of the simple image development unit 111, it is possible to process frames having 3840×2160 pixels at 15 frames per second, for example. In the case shown in FIG. 10, by simple image development when performing slow playback at a display rate of ½, frames having 2560×1440 pixels are processed at 30 frames per second. In the case shown in FIG. 10, by simple image development when performing slow playback at a display rate of ¼, frames having 3840×2160 pixels are processed at 15 frames per second. In the case shown in FIG. 10, by high quality image development when performing slow playback at a display rate of ⅛, frames having 3840×2160 pixels are processed at 7.5 frames per second. In a case where a rate of ⅛ or less exists, likewise by high quality image development, frames having 3840×2160 pixels are processed.

Figure 11:
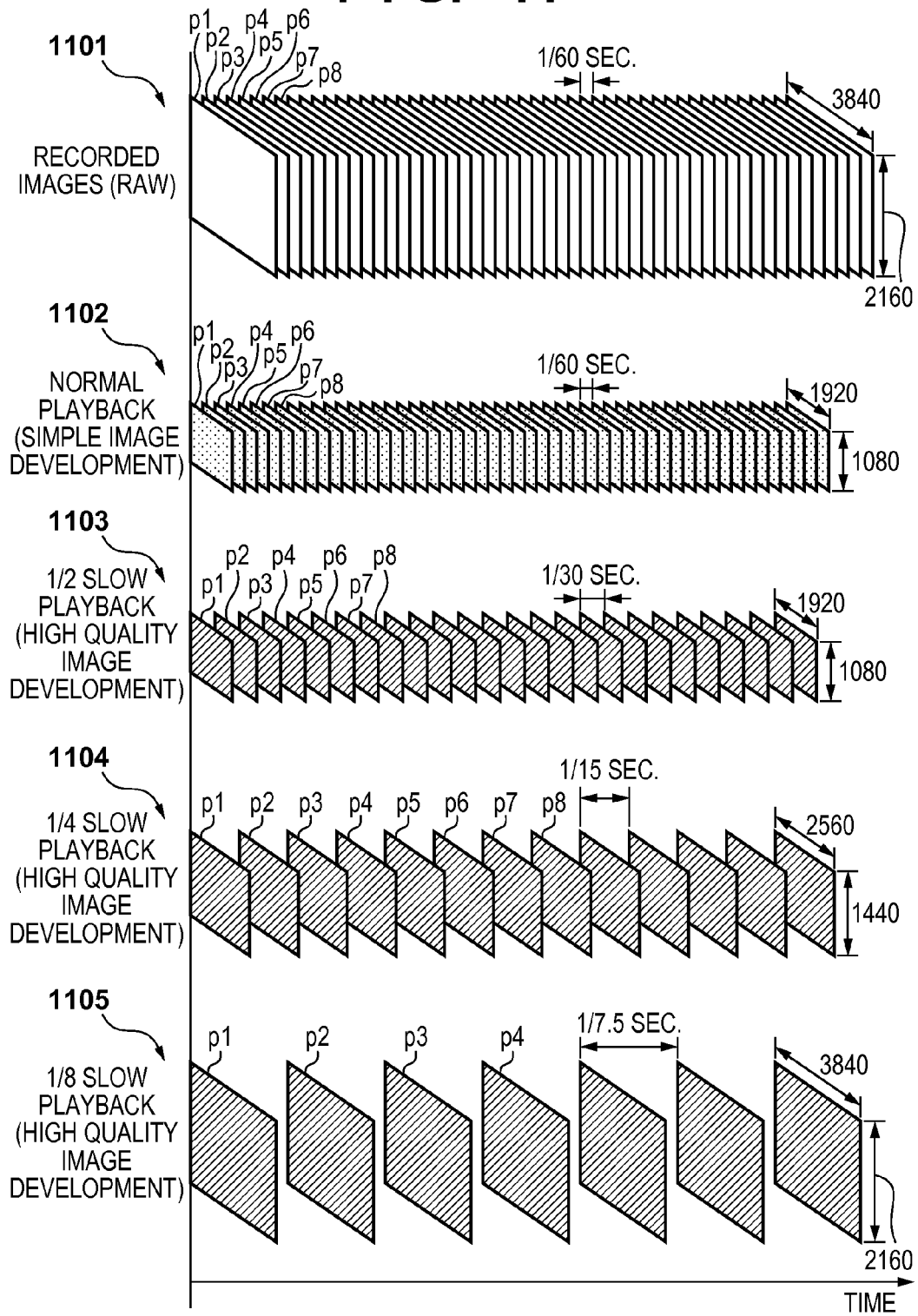
FIG. 11 illustrates another example of switching image development processing during slow playback display according to an embodiment of the invention.

In the above examples, the resolution of frames to be developed is increased while performing simple image development in a case where image development processing takes time. Thus, in a case where the display rate is changed, the frame size displayed after the change can be made larger than the frame size prior to reducing the display rate. In other cases as well, in order to perform noise removal or optical distortion correction while maintaining resolution, high quality image development may be performed. FIG. 11 schematically shows display frames corresponding to the various display rates in such a case.

FIG. 11 is similar to FIG. 10. In the case shown in FIG. 11, by high quality image development when performing slow playback at a display rate of ½, frames having 1920×1080 pixels, the same size as in FIG. 10, are processed at 30 frames per second. In the case shown in FIG. 11D, by high quality image development when performing slow playback at a display rate of ¼, frames having 2560×1440 pixels are processed at 15 frames per second. In this way, as the processing time for one frame increases, the frame size can be made larger.

Next, in S906, the display control unit 122 forms a display image from the image information that has undergone image development processing, outputs the display image to the display unit 123 or an external display device, and displays the display image. Note that the display in S906 is performed for each single frame, and during movie playback, display of the next frame is performed, so the flow of processing returns to S901. In S901, when processing has moved to the idle state in S910, processing is performed according to the flowchart in FIG. 5 described above.

In this way, the image capturing apparatus 100 of the present embodiment, by simple image development, can play back a movie with a small circuit scale and low power consumption, and in a slow playback state, can display an image that was developed at a higher resolution than in normal playback, or can display an image that was developed with higher image quality than in normal playback.

Embodiments of the invention were described above, but the invention is not limited to the above embodiments, and within the scope of the technical idea of the invention, the invention also encompasses appropriate modifications by altering the form of a circuit in which the invention is applied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-209395, filed on Oct. 10, 2014, which is hereby incorporated by reference herein in its entirety.

What is claimed is:

1. An image processing apparatus, comprising:
one or more processors; and
one or more a memories storing a computer program which, when executed by the one or more processors, causes the one or more processors to perform operations comprising:
reading out a movie file that includes a plurality of RAW images from a recording medium;
developing the plurality of RAW images included in the movie file;
displaying a plurality of images developed in the developing on a display unit; and
instructing a display rate of images to be displayed on the display unit, wherein the display rate includes a first display rate and a second display rate which is lower than the first display rate,
wherein in the developing, first image development processing that develops the RAW images or second image development processing that has a higher quality processing than the first image development processing is executed, and
in the developing, image development processing of the RAW images is switched from the first image development processing to the second image development processing and image being displayed on the display unit is switched from image of the first display rate developed by the first development processing to an image of the second display rate developed by the second development processing, when the second display rate is instructed in the instructing while the image developed by the first image development processing is being displayed at the first display rate on the display unit.

2. The image processing apparatus according to claim 1, wherein if there was an instruction to lower the display rate from the first display rate to the second display rate in the developing, a frame size after image development is set to be larger than a frame size prior to lowering the display rate.

3. The image processing apparatus according to claim 1, wherein if there was an instruction to lower the display rate from the first display rate to the second display rate, a frame size after image development is set to be larger as the instructed display rate becomes slower in the developing.

4. The image processing apparatus according to claim 1, wherein if there was an instruction to lower the display rate from the first display rate to the second display rate, the second image development processing is performed when a frame size after image development is set to match a predetermined size, and the first image development processing is performed when the frame size after image development is less than the predetermined size, in the developing.

5. The image processing apparatus according to claim 4, wherein the predetermined size is a size possessed by the RAW ages.

6. The image processing apparatus according to claim 1, wherein if there was an instruction to lower the display rate from the first display rate to the second display rate, when a display rate of a predetermined rate or less was instructed, frame size after image development is et to a predetermined size and the second image development processing is performed, in the developing.

7. The image processing apparatus according to claim 1, further comprising:
an image sensor;
wherein the operation further comprising:
generating RAW images using an image that was obtained by the image capturing unit; and
recording a movie file at includes a plurality of the generated maps to the recording medium.

8. A method for operating an image processing apparatus, comprising:
at the image processing apparatus comprising one or more processors and one or more memories storing a computer program for execution by the one or more processors:
reading out a movie file that includes a plurality of RAW images from a recording medium;
developing the plurality of RAW images included in the movie file;
displaying a plurality of images developed in the developing on a display unit; and
instructing a display rate of images to be displayed on the display unit, wherein the display includes a first display rate and a second display rate which is lower than the first display rate,
wherein in the developing, first image development processing that develops the RAW images or second image development processing that has a higher quality processing than the first image development processing is executed, and
in the developing, the image development processing of the RAW images switched from the first image development processing to the second image development processing and an image being displayed on the display unit is itched from an image of the first display rate developed by the first development processing to an image of the second display rate developed by the second development processing, when the second display rate is instructed in the instructing, while the image developed by the first image development processing is being displayed at the first display rate on the display unit.

9. A non-transitory computer readable storage medium on which is stored a program causing an image processing apparatus to perform operations of; reading out a movie file that includes a plurality of items of RAW image data from a recording medium;
developing the plurality of RAW images included in the movie file;
displaying a plurality of image developed in the developing bra a display unit; and
instructing a display rate of images to be displayed on the display unit, wherein the display rate includes a first display rate and a second display rate which is lower than the first display rate, wherein in the developing, first image development processing that develops the RAW images or second image development processing that has a higher quality processing than the first image development processing is executed, and in the developing, the image development processing of the RAW images is switched from the first image development processing to the second image development processing and an image being displayed on the display unit is switched from an image of the first display rate developed by the first development processing to an image of the second display rate developed by the second development processing, when the second display rate is instructed in the instructing, while the image developed by the first image development processing is being displayed at the first display rate on the display unit.

* * * * *